United States Patent [19]

Rao

[11] 4,409,662

[45] Oct. 11, 1983

[54] PROGRAMMABLE DIGITAL TEMPERATURE CONTROLLER

[75] Inventor: Prabhakar P. Rao, Duncan, Okla.

[73] Assignee: Halliburton Company, Duncan, Okla.

[21] Appl. No.: 221,008

[22] Filed: Dec. 29, 1980

[51] Int. Cl.³ .............................................. G05D 23/00
[52] U.S. Cl. .................................... 364/557; 364/477; 377/25
[58] Field of Search .............. 364/557, 477, 705, 715, 364/709, 180, 181; 219/10.55 B, 492, 497, 506; 235/92 MT; 307/117; 73/339 R, 343.5

[56] References Cited

U.S. PATENT DOCUMENTS

| 3,911,424 | 10/1975 | Giannuzzi et al. | 364/709 |
| 4,063,075 | 12/1977 | Collom | 364/477 |
| 4,071,745 | 1/1978 | Hall | 364/557 |
| 4,206,872 | 6/1980 | Levine | 219/492 |
| 4,286,465 | 9/1981 | Thomae | 364/557 |
| 4,298,946 | 11/1981 | Hartsell et al. | 364/181 |
| 4,328,408 | 5/1982 | Lawson | 219/10.55 B |

Primary Examiner—Gary Chin
Attorney, Agent, or Firm—William J. Beard

[57] ABSTRACT

Temperature of a heating device is controlled by a microprocessor in an electrical circuit which electrically communicates temperature control signals to the heating device. The control signals are generated from a predetermined compilation of data stored in the electrical circuit or from external data which can be entered and used to control the temperature in the heating device to a selectable value at a rapid rate or to achieve one or more temperatures at selected rates. The external data entry and control is provided by a human-electronic interface.

11 Claims, 8 Drawing Figures

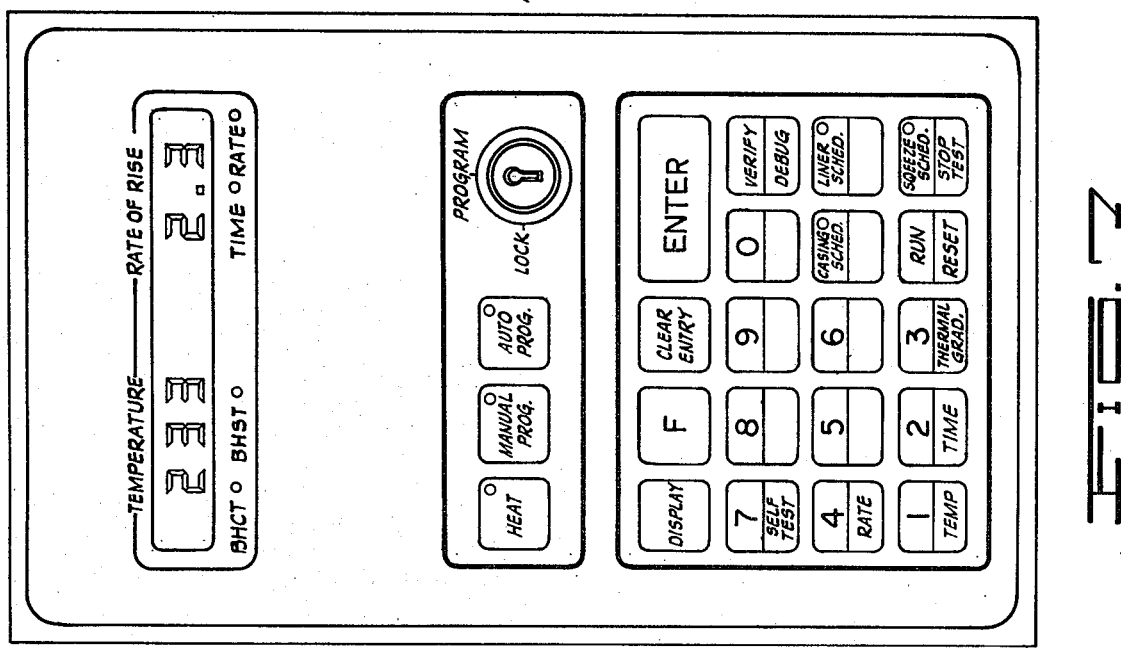
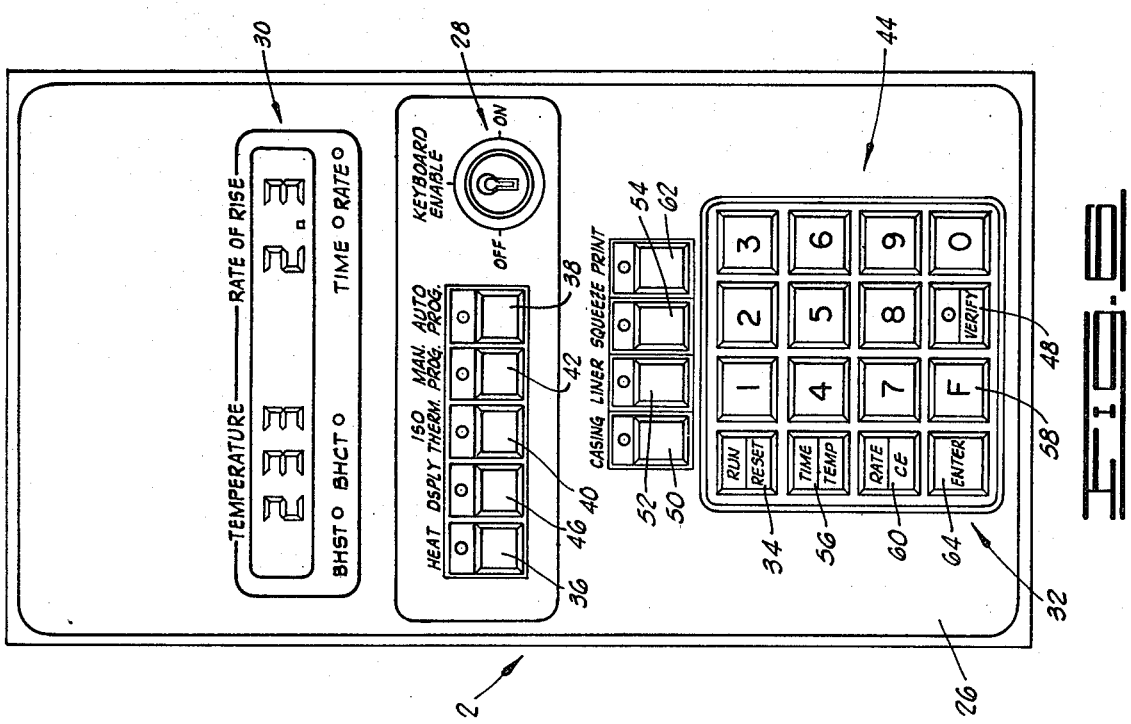

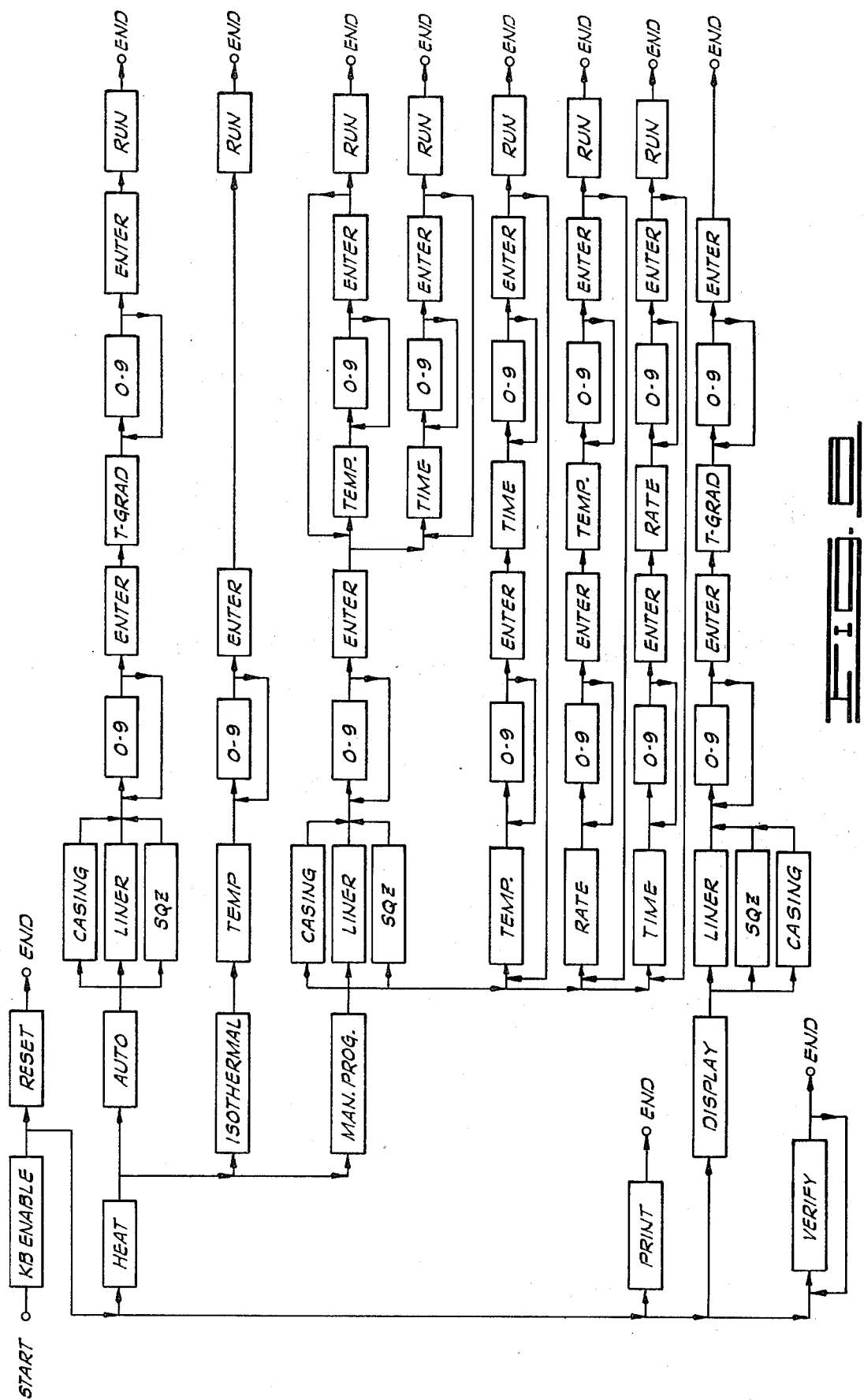

PROGRAMMABLE DIGITAL TEMPERATURE CONTROLLER

This invention relates generally to apparatus for controlling temperature and more particularly, but not by way of limitation, to programmable digital temperature controllers used in the testing of cement slurries normally used in the oil well industry.

In testing the characteristics of materials it is often desirable to place the material in an environment in which the temperature can be controlled so that the effects of various temperatures on the material can be determined. For example, in the oil and gas industry cement which is to be used for various purposes in well drilling and oil and gas recovery operations must be analyzed to determine if it will be able to withstand the various temperatures to be encountered at various depths of the downhole environment. Because there are differences between types of cement and between batches of cement, there needs to be some means for readily testing the temperature effects on each particular batch of cement prior to pumping it downhole.

Some previously used types of testing equipment have provided for destructively testing a hardened cement sample at atmospheric conditions only. These types are disadvantageous because they are destructive, they waste time by requiring the cement to harden, and they do not permit different pressure and termperature conditions to be applied to the test sample. Therefore, it is desirable to provide a testing means which nondestructively tests, at variable temperatures and pressures, samples of the cement slurry as it is being mixed or at least prior to becoming hardened.

In addition to the foregoing disadvantages of previous types of equipment used to test cement which is to be used during the drilling and/or use of oil or gas wells, such equipment also has the disadvantage of not using American Petroleum Institute (API) compilations of temperature and time data for attaining and controlling temperatures which are known to be, or are likely to be, associated with specific well depths and which are to be reproduced by the testing means. This disadvantage can be overcome by constructing the testing means so that it is able to store and utilize complete standard API schedules of data and to interpolate between discrete entries in the schedules when necessary.

Additionally, prior equipment has been unable to readily modify individual parameters used to control the temperature. Therefore, it is also desirable to construct a testing means so that it is able to have the entries from the API schedules discretely changed or to have modifications entered in the testing means for utilization in the place of the previously entered predetermined data of the API schedules.

Still another desirable feature of the testing means to be constructed to control temperature is the capability to have the stored schedules externally inspected while the temperature controller means is operating to control temperature.

The present invention overcomes the above-noted and other shortcomings of the prior art by providing a novel and improved programable digital temperature controller. This controller is generally used to control temperature, and more specifically is designed to control a test environment for non-destructively testing samples of cement used in the oil and gas industry. The testing of the cement occurs as it is being mixed or prior to becoming hardened.

The present invention specifically has the API cement temperature and time schedules contained within it so that a cement sample can be automatically tested according to these schedules without the operator actually knowing the details of the schedules. This storage of the cement temperature and time schedules is achieved and utilized by means of a microprocessor and associated information storage means. The microprocessor is operated so that interpolations between discrete entries in the API schedules can be obtained.

Additionally, the operator can review any of the API schedules in the present invention without disturbing the temperature controlling operation thereof.

The present invention also is constructed so that data stored therein can be manually altered and so that modification parameters can be stored therein for use in place of the previously entered predetermined data of the API schedules. For example, in one state of operation the present invention automatically determines the bottom hole circulating temperature (BHCT), the bottom hole static temperature (BHST), and the two times associated with these temperatures based on whether the casing API schedule, the liner API schedule, or the sequeeze API schedule of data has been selected. (The casing schedule, liner schedule and the squeeze schedule refer to compilations of temperatures and times for given depths which are encountered, respectively, in cementing casing tubing, in cementing liner tubing, and in formations into which cement has to be squeezed under pressure.) The temperature controller then controls the temperatures applied to the test sample according to this information. However, in some instances it may be necessary to modify some of these parameters while leaving the rest as they are. In such cases a second state of operation of the present invention is selected to allow modifications to be entered. These modifications are then used instead of all the data from the predetermined API schedules.

Broadly, the present invention provides an apparatus for controlling the temperature of a heating device. The apparatus comprises circuit means for generating temperature control signals and for electrically communicating the temperature control signals to and from the heating device. The circuit means has a predetermined compilation of data stored therein. In the preferred embodiment the compilation of data includes the API temperature and time schedules known in the art to be used to test cement which is to be used in a casing, a liner or a squeeze type of use.

The inventive apparatus also comprises heat control means for controlling the communication of the temperature control signals from the circuit means to the heating device. The heat control means includes automatic operation select means for causing the circuit means to generate the temperature control signals utilizing the predetermined compilation of data. The heat control means further includes isothermal operation select means for causing the circuit means to actuate the heating device to attain an externally selectable temperature. The heat control means still further includes manual operation select means for externally entering data into the circuit means so that the circuit means variably controls the heating device based at least in part on the externally entered data.

The inventive apparatus further comprises display control means for selectively displaying the magnitudes of temperatures achieved by the heating device and the values of the data used by the circuit means to control the heating device.

The apparatus also comprises verification control means for displaying a current operating temperature and time of the heating device.

Therefore, from the foregoing, it is a general object of the present invention to provide a novel and improved programmable digital temperature controller. Other and further objects, features and advantages of the present invention will be readily apparent to those skilled in the art when the following description of the preferred embodiment is read in conjunction with the accompanying drawings.

FIG. 6 is a front elevational view of a preferred embodiment of a human-electronic interface of the present invention.

FIG. 7 is a front elevational view of another preferred embodiment of a human-electronic interface of the present invention.

FIG. 8 is a flow chart of the keyboard operations of the present invention.

Figure 1:
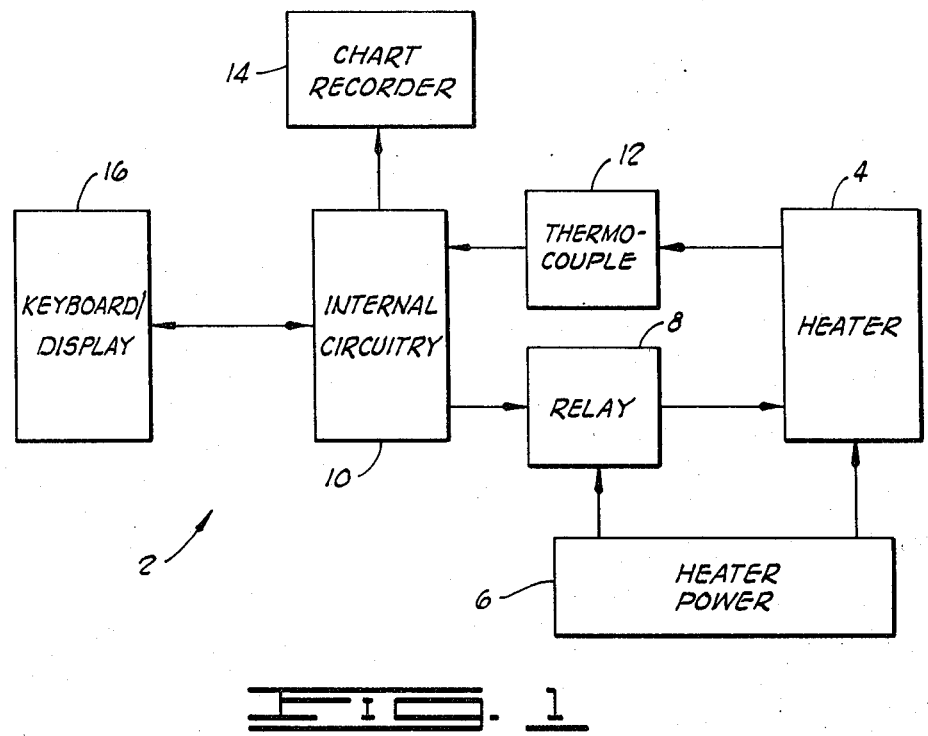
FIG. 1 is a block diagram of the present invention.
Figure 2:
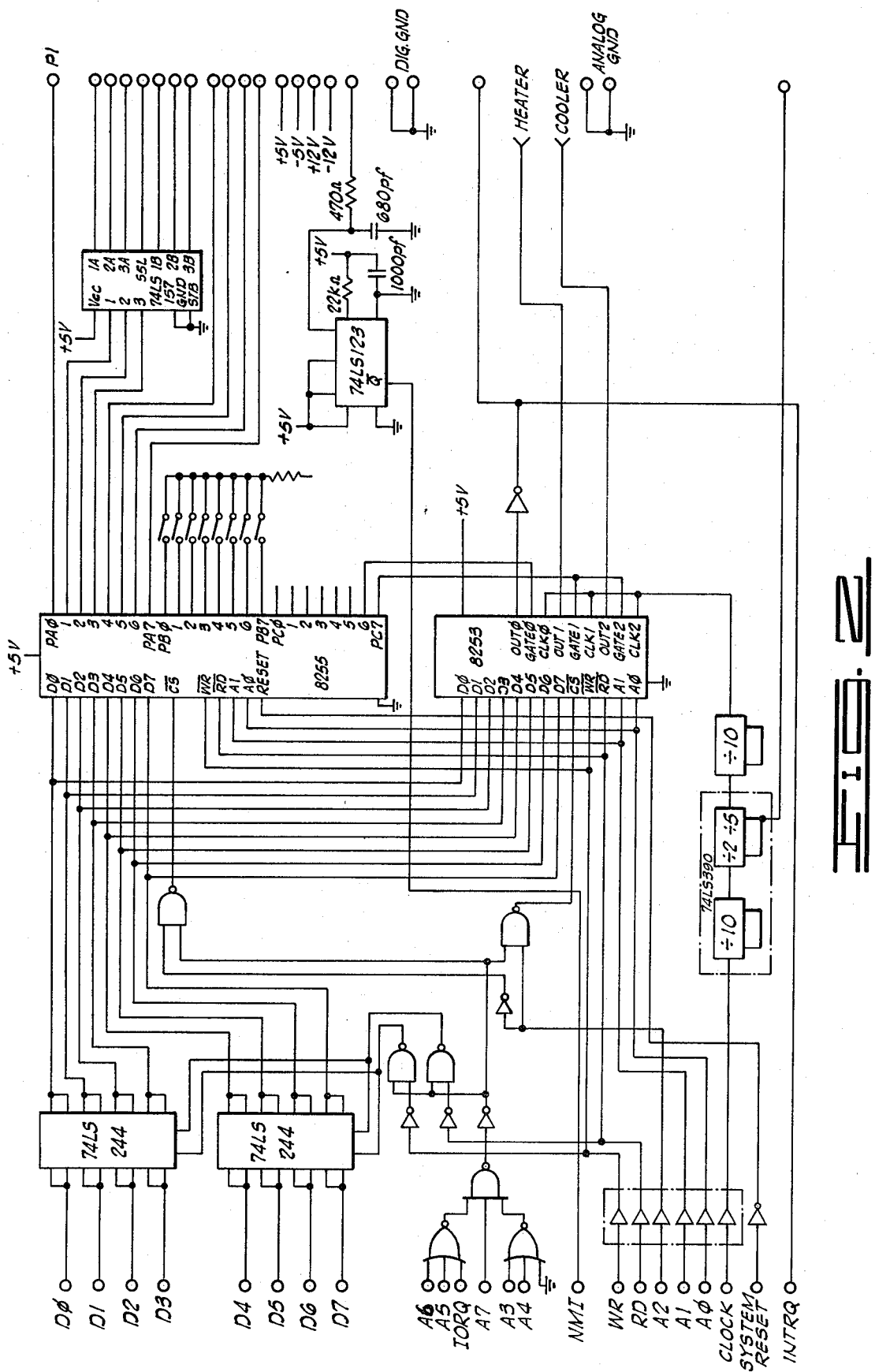
FIG. 2 is a schematic circuit diagram of a specific embodiment of a first portion of the present invention.
Figure 3:
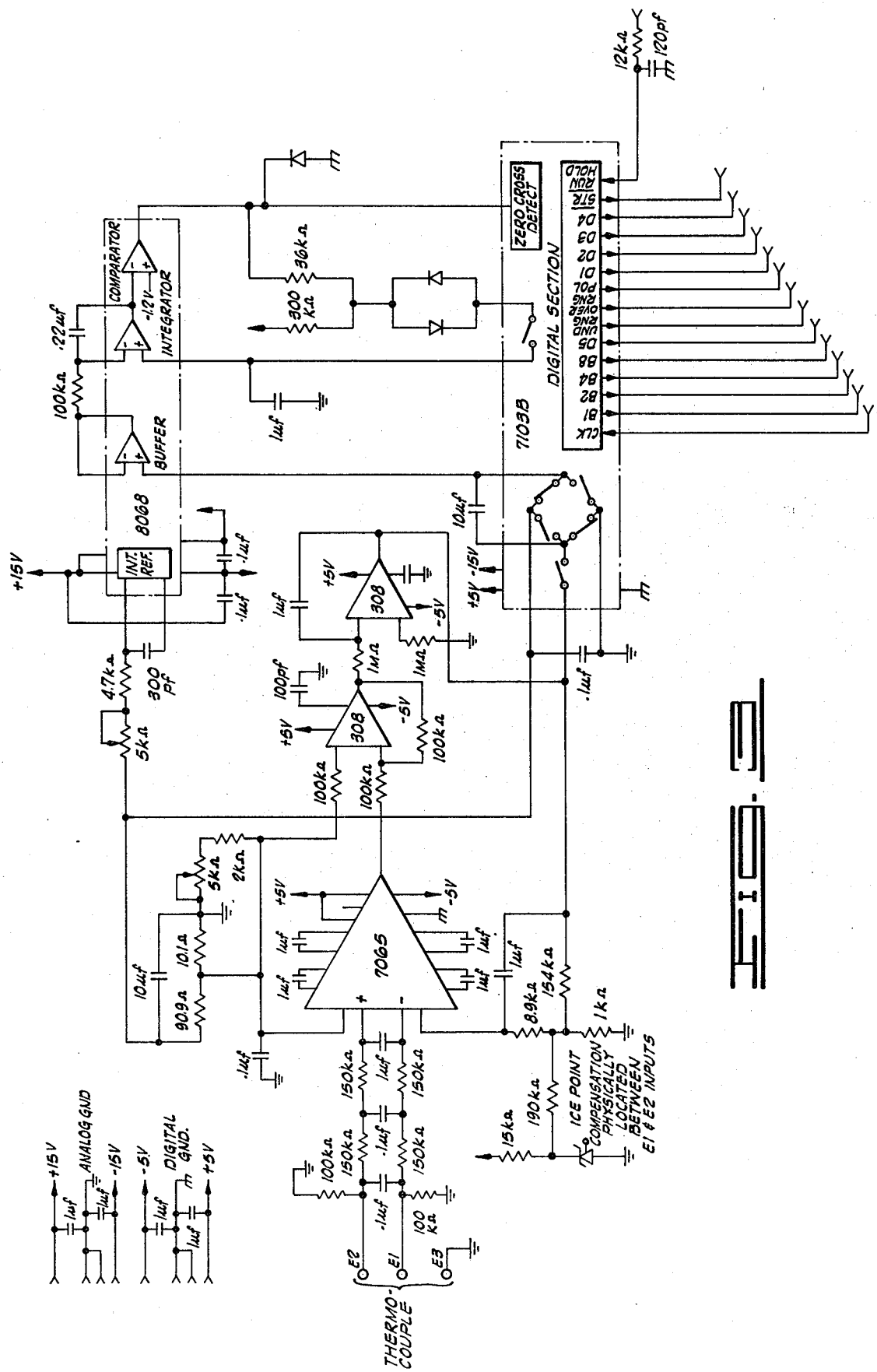
FIG. 3 is a schematic circuit diagram of a specific embodiment of an analog-to-digital converter portion of the present invention.

With reference to the drawings, the preferred embodiments of the present invention will be described. FIG. 1 discloses an apparatus 2 for controlling the temperature of a heating or temperature device 4 which is switchably connected to a suitable heater power source 6 through a relay 8 which is controlled by internal circuitry means 10 of the present invention. The heating device 4 may be of any suitable type such as a single-stage, 25 amp at 120 VAC or 30 amp at 120 VAC supply. The temperature in the heating device 4 is detected by a suitable thermocouple 12 or other heat detecting means for converting the detected heat level or temperature into a corresponding electrical signal which is transmitted to the internal circuitry means 10. In the preferred embodiment the thermocouple 12 is a J-type thermocouple with a 0°-600° F. range and a 1° F. resolution, but other suitable types can be used.

The internal circuitry means 10 includes circuit means for generating temperature control signals and for electrically communicating the temperature control signals to the heating device 4. In particular, the circuit means 10 includes computer means, such as an Intel 8085 microprocessor or other suitable microprocessor and accompanying integrated circuits including information storage, or memory, means for overseeing the generation of the temperature control signals and the electrical communication thereof with the heating device 4.

Figure 4:
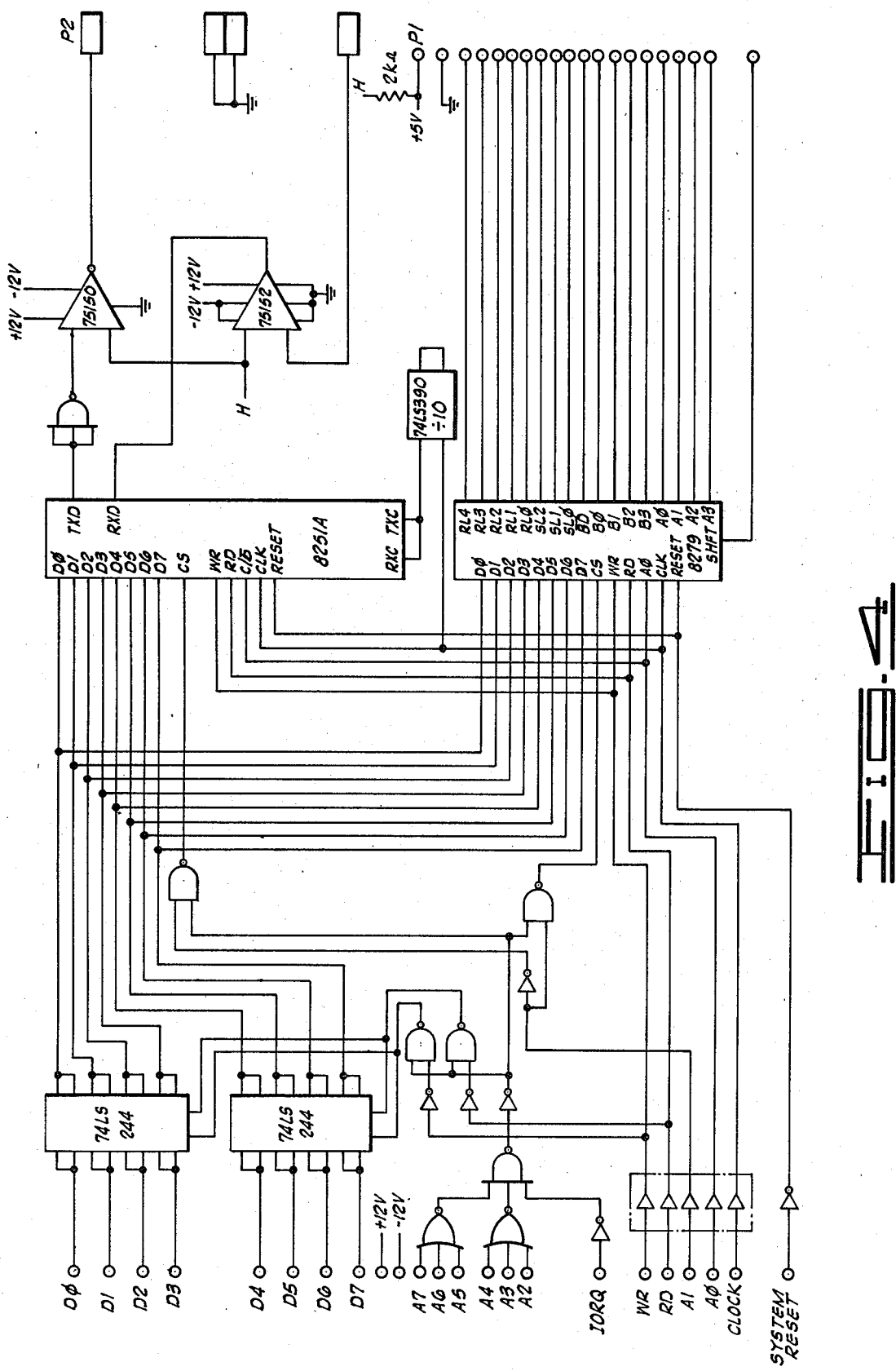
FIG. 4 is a schematic circuit diagram of a specific embodiment of a display/keyboard/serial input-output portion of the present invention.
Figure 5:
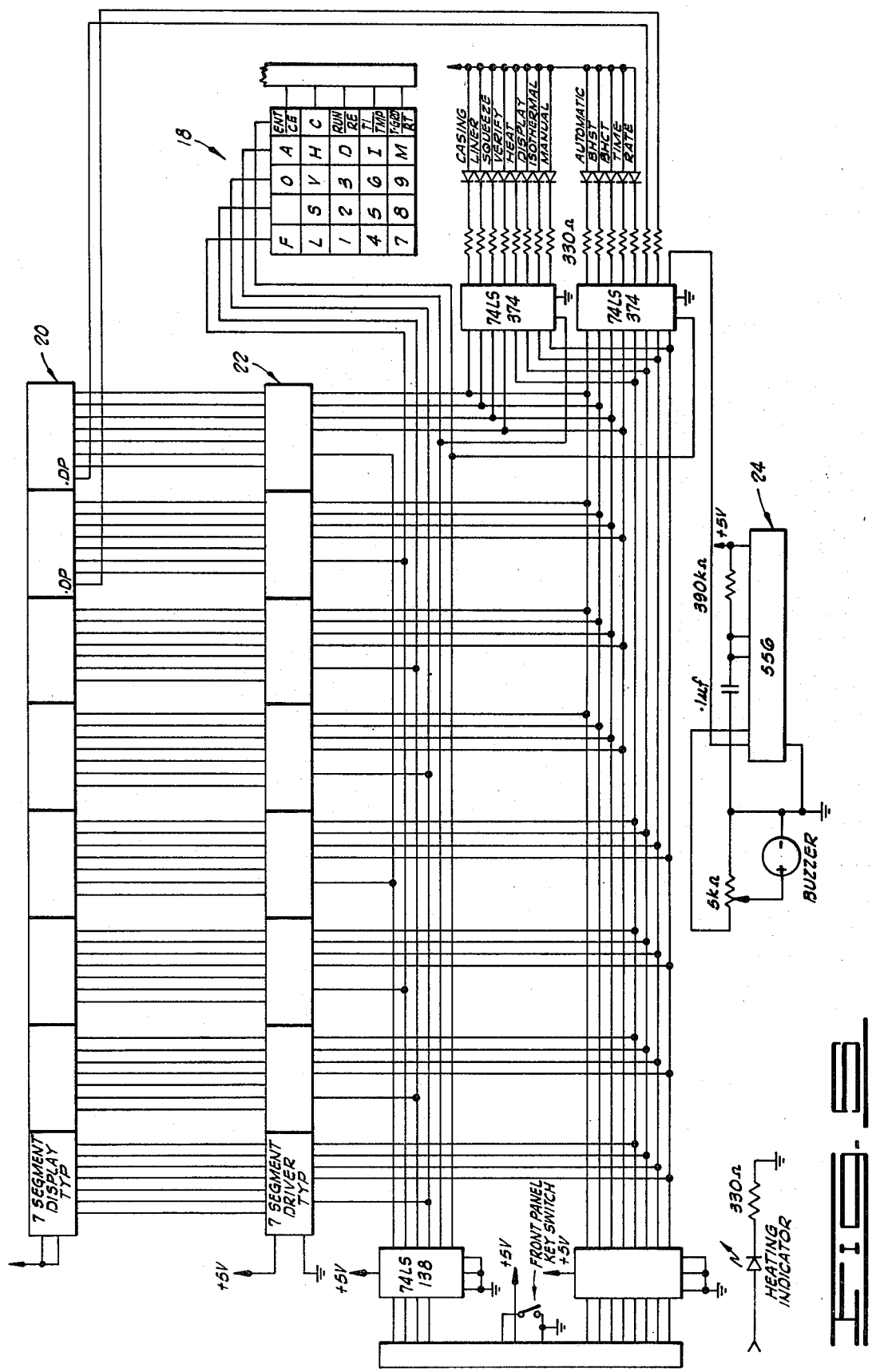
FIG. 5 is a schematic circuit diagram of a specific embodiment of a front panel portion of the present invention.

Additionally, the circuit means 10 includes the electrical circuits shown in FIGS. 2-5. The circuits disclosed in these figures are self-explanatory and will not be discussed herein other than to point out to what each pertains. The circuit disclosed in FIG. 2 pertains to the control interface with the heating device 4. The circuit in FIG. 3 includes an analog-to-digital conversion circuit for converting the analog signal from the thermocouple 12 to a digital signal, and the circuit shown in FIG. 4 includes an electronic circuit used in the interfaces for a display, a keyboard, and a serial input-output portion of the present invention. The serial input-output portion provides a suitable interface between the apparatus 2 and a chart recorder means 14 for providing a printout of the operation of the apparatus 2. FIG. 5 discloses the front panel electronics of a human-electronic interface disclosed in FIG. 1 to include a keyboard/display means 16. FIG. 5 discloses that the keyboard/display means 16 includes a first preferred embodiment keyboard 18 and a display means including an eight-digit alphanumeric display 20 having appropriate seven-segment driver means 22 associated therewith. The keyboard/display means 16 further includes audible indicator means 24 for providing indicator sounds to the operator of the present invention as will be more fully described hereinbelow.

The human-electronic interface portion of the present invention will be more fully described with reference to the second preferred embodiment of the keyboard/display means 16 shown in FIG. 6. This embodiment discloses that the present invention includes a front panel 26 having a lockable on/off switch means 28, a visual display means 30 similar to the display 20 shown in FIG. 5, and a plurality of keys disposed thereon. The on/off switch means 28 is a three-position switch which, in the preferred embodiment shown in FIG. 6, includes an off position, a keyboard enable position and an on position. The display means 30 includes alphanumeric displays similar to those identified in FIG. 5 by the reference numeral 20 and also includes a plurality of illuminable elements, such as light-emitting diodes, to indicate what type of information is being displayed. In the preferred embodiment the display means 30 can display the bottom hole static temperature (BHST) or the bottom hole circulating temperature (BHCT) in either degrees Farenheit or degrees Centigrade, the time in minutes, the rate of temperature change in degrees per minute, and any error message associated with the running of the present invention.

The control keys contained on the front panel 26 include a plurality of individual switches as well as an array of sixteen switch keys contained on a key pad 32. In the preferred embodiment the individual switches are of the rocker type, and each includes suitable visual indicating means, such as a light-emitting diode, associated therewith. The key pad 32 includes sixteen membrane type switches. The sixteen switches include ten digit switches, five major function keys and fifteen minor function keys which can be obtained by actuating an appropriate function select key 58 contained on the key pad 32.

The aforementioned switches are appropriately electrically connected with the internal circuit means 10 as shown in the specific embodiment of FIG. 5 so that each has at least one respective purpose. In particular, the switches on the front panel 26 of the apparatus 2 include a plurality of function control switch means for directing the operation of the temperature control device 2. The function control switch means includes a reset switch 34 providing means for placing the computer means of the circuit means 10 in a reset state to receive function commands from the remainder of the function control switch means.

The function control switch means also includes a heat mode select control switch means 36 for providing means for sending a first function command to the computer means to place the computer means in a heat mode from which one of three selectable heat operation states can be entered. This first function command signal controls the communication of the temperature control signals from the circuit means 10 to the heating device 4. This operation provides a heat control means for the apparatus 2 which is actuated specifically by the switch 36.

Once the heat mode select control switch means 36 has been actuated, the apparatus 2 enters one of the aforementioned three selectable heat operation states upon the actuation of a suitable corresponding switch means. The three selectable heat operation states are entered by actuating one of the means including an automatic program state select switch means 38, an isothermal state select switch means 40, and a manual program state select switch means 42. By actuating one of these three switch means, one controls the computer means of the circuit means 10 so that either automatic operation, isothermal operation, or manual operation is selected for controlling the temperature in the heating device 4.

When the automatic program state select switch means 38 is actuated, the circuit means 10 generates temperature control signals utilizing a predetermined compilation of data stored in the information storage means of the circuit means 10. In a specific embodiment of the present invention the predetermined compilation of data includes temperature and time data from the American Petroleum Institute tables pertaining to parameters used for testing cement used in downhole environments. The temperature and time data are provided for given depths and for the downhole operations of setting casing tubing or liner tubing and the operation of squeezing a formation.

When the isothermal state select switch means 40 is actuated, the apparatus 2 functions in an isothermal operation state wherein a temperature value is entered in the apparatus 2 to direct the computer means to control the temperature of the heating device 4 to the entered temperature value. Thus, the isothermal state select switch means 40 causes the temperature control device 2 to adjust the temperature in the heating device 4 to a selectable value.

When the manual state select switch means 42 is actuated, the apparatus 2 enters the manual operation state wherein a temperature value or a time value or a rate value or a temperature gradient value can be entered in the apparatus 2 to direct the computer means to adjust the temperature accordingly. Thus, the manual state select switch means 42 permits the temperature control device 2 to utilize both the predetermined data stored in the information storage means and variable data externally entered through appropriate information entry means. The information entry means particularly includes information entry switch means 44 described subsequently hereinbelow.

In addition to the heat mode select switch means 46, the function control switch means of the present invention includes a display mode select switch means 46 for actuating the temperature control device 2 to display the information used by the temperature control device during its operation. The switch means 46 provides means for sending a second function command signal to the computer means of the circuit means 10 to place the computer means in a display mode from which one of three selectable display operation states can be entered. In the display mode the apparatus 2 selectably displays the magnitudes of temperatures achieved by the heating device and the values of the data used by the circuit means 10 to control the heating device 4.

The function control switch means also includes verify mode select switch means 48 for sending a third function command signal to the computer means of the apparatus 2 to place the computer means in a verify mode wherein data can be viewed through the display 30. In the preferred embodiment actuation of the verification control switch means 48 directs the temperature control device 2 to sequentially display information signifying first predetermined operating parameters (such as the BHCT and associated time), second predetermined operating parameters (such as the BHST and associated time), and the actual or current operating temperature and time conditions that are to be used by the device 2.

In addition to the function control switch means previously described, the switch means contained on the front panel 26 of the human-electronic interface of the apparatus 2 includes information select switch means. The information select switch means electrically signals the temperature control device 2 as to the nature of the information which is to be written to or read from the information storage means of the circuit means 10.

The information select switch means includes casing data select switch means 50 for directing the temperature control device 2 to utilize the casing temperature and time parameters of the predetermined API tables of data stored in the information storage means to control the temperature of the heating device 4. The information select switch means also includes liner data select switch means 52 for directing the temperature control device 2 to utilize the liner temperature and time parameters forming a part of the predetermined data to control the temperature of the heating device 4. The information select switch means still futher comprises squeeze data select switch means 54 for directing the temperature control device 2 to utilize the squeeze temperature and time parameters of the predetermined data to control the temperature of the heating device 4.

The information select switch means also comprises temperature information select switch means and time information select switch means which, as shown in the embodiment of FIG. 6, can be achieved from a single switch element 56 when used in conjunction with a primary/secondary function select switch means 58 contained on the key pad 32. The information select switch means also includes a rate information select switch means which is achieved through a switch element 60. The switch element 60 also provides a clear entry function upon the appropriate actuation of the function select switch means 58. A thermal gradient information select switch means is also included in the embodiments of the information select switch means shown in FIGS. 5 and 7.

Along with the function control switch means and the information elect switch means, the switch means of the front panel 26 also includes the information entry switch means 44. In the preferred embodiment the information entry switch means 44 includes the ten numerical data entry keys shown in each of the embodiments of FIGS. 5, 6, and 7. The information entry switch means 44 is to be actuated after an individual element of the information select switch means has been actuated so that information can thereby be entered into the information storage means of the temperature control device 2.

A final switch of the preferred embodiment front panel 26 shown in FIG. 6 is a print control switch means 62 which is of the rocker type and includes an illuminable indicator device, such as a light-emitting diode, to indicate when the switch has been actuated. When the switch means 62 is appropriately actuated, information is transmitted to a suitable printer through an RS232C interface provided in the circuit means 10 of the present invention as illustrated in FIG. 4.

A third embodiment of the human-electronic interface of the present invention is shown in FIG. 7. As will be noted, similar switch means and display means are contained on the front panel of the embodiment shown in FIG. 7.

With reference primarily to FIGS. 5, 6 and 8, the operation of the preferred embodiments will be described. Initially, an appropriate switch means contained within the circuit means 10 is manipulated to select either Fahrenheit or Centigrade operation. Next, the lock switch means 28 is turned to either its "keyboard enable" or its "on" position to activate the system. Upon activation of the apparatus 2, the apparatus 2 enters the reset state wherein the current temperature in the heating device 4 is displayed and keyboard functions or numerical entries can be made. In the preferred embodiment each functional entry made, such as for each actuation of an element of either the function control switch means or the information select switch means, is confirmed by one beep if the entry is the primary definition of the switch means element (e.g., time information select switch means of switch means 56) or by two beeps if the secondary definition of the switch means element (e.g., temperature information select switch means of switch element 56) is used. The secondary definition is achieved by actuating the function, or F, select switch means 58. If the selected entry is an unacceptable input, five beeps are sounded. The sonic signals, or beeps, are provided by the audible indicator means 24 shown in FIG. 5.

Once an entry has been made, the clear enable (CE) switch means provided by the switch element 60 can be used to clear the entire entry chain one at a time back to the reset state in which the apparatus 2 initially started. The reset state can be attained at any time by pressing the reset key 34 after appropriate manipulation of the function select key 58.

To make numerical entries via the information entry switch means 44, the number entry must be immediately followed by the actuation of an enter key 64 shown in FIG. 6. Before the enter key 64 is actuated, individual digits may be deleted by pressing the CE key 60. Once the enter key 64 is pressed, appropriate use of the CE key deletes the entire number, and the apparatus 2 is ready to have another number entered. It is to be noted that the meaning of the number (e.g., time, temperature, etc.) must be specified by using the elements of the information select switch means before numerical information is selected and entered.

Whenever incorrect functional or numerical information is attempted to be entered, five beeps are sounded to indicate an unacceptable input. If a different error has occurred, an error code will be displayed in the display means 30. The error code is automatically removed from the display means 30 after a predetermined time period.

With reference now more particularly to FIG. 8, the various operating modes and states of the apparatus 2 will be described. It is to be noted that the apparatus 2 commences operation in the reset mode and returns to this mode at the end of each operating string which will be subsequently described. Broadly, from the reset mode the heat mode can be entered to control the heating of the heating device 4 or the display mode can be entered to access values in the internal tables contained in the information storage means or the verify mode can be entered to display the present operating parameters of temperature and rate of change of temperature per minute.

In the heat mode any one of three states can be entered. One of these three states is the automatic state wherein the heating temperatures and time are determined by the API data tables contained in the information storage, or memory, means. Another of the states is the isothermal state wherein the heating device 4 is heated to a specific temperature which can be entered through the human-electronic interface at the maximum possible rate as determined by the computer means. The third state is the manual state wherein a number of options are available as will be subsequently described.

When the heat mode has been entered by appropriately actuating the heat mode select switch means 36 for the FIG. 6 embodiment, the light-emitting diode associated therewith is continuously on while heat is being applied and is flashing at a predetermined rate, such as 1 Hz, when the final temperature has been reached. Heat is applied during the heat mode only if one of the automatic state select switch means, isothermal state select switch means or manual state select switch means is actuated to place the apparatus 2 in one of the three respective states and if a temperature higher than the ambient temperature has been selected to be generated in the heating device 4.

In the automatic state of the heat mode both the temperatures to be achieved in the heating device 4 and the times during which the temperatures are to be achieved are automatically determined by the computer means from the internally stored predetermined API data once the appropriate schedule or table is chosen. The appropriate schedule is chosen by appropriately actuating one of the casing select switch means 50, liner select switch means 52 or squeeze select switch means 54 after the automatic state has been entered. Additionally, a well depth of between 1000 feet and 20,000 feet must be entered so that the appropriate temperatures and times can be accessed from the selected API table. In addition to selecting one of the three possible API schedules and the depth, a temperature gradient of from 0.9° F./100 feet to 1.9° F./100 feet (in odd tenths only for the preferred embodiment) can be selected. If no temperature gradient is entered, the computer means assumes a default value of 1.5° F./100 feet in its calculations. Once this information has been entered, the computer means enters into its running memory the BHCT, BHST, and the two associated times from the selected API table or as linearly interpolated based on the entered or default temperature gradient value and the starting temperature on which the first heating ramp is to be computed. The run switch means, which is identified as being the primary function of the key 34, is actuated do that the internal clock of the computer means is initialized and the program is started into operation. Control is returned to the reset mode at this time for subsequent external control of the apparatus 2 via the human-electronic interface. During the automatic state the display means indicates the actual temperature and the rate at which the heat is being applied.

In the isothermal state of the heat mode only one temperature can be accepted as an input as indicated in the isothermal portion of the flow chart shown in FIG. 8. Upon the entry of a temperature value, BHST is set to the entered value, BHCT is the starting temperature, and both of the associated time parameters are set to zero. To start the heating, the run key 34 is actuated.

In the manual state of the heat mode the maximum temperature, the time or the rate can be entered via the keyboard of the human-electronic interface. If an API table is selected and a temperature parameter is entered, the computer means determines the time or rate from the information stored in the memory. If a table and a time are selected, then the temperature is determined from the predetermined contents of the memory. If, however, an API table is not selected but both a temperature and a time or a rate are entered, these values will supersede the predetermined values in the memory. More specifically, the manual state has two major substates, an automatic with partial override substate and a ramp substate.

The automatic with partial override substate may be accessed by actuating one of the casing, liner or squeeze select switch means and then by entering a depth value of between 1000 feet and 20,000 feet. If the computer means were in the automatic state at this point, the computer means would compute BHCT, BHST, and the associated times from the stored API tables and with an assumed temperature gradient of 1.5° F./100 feet; however, at this point in the partial override substate of the manual state, the operator may override either one or both of the API temperatures or one or both of the API times, but not both temperature and time. To override the API values, the operator actuates the temperature/time select key 56 in either of its functional modes. If the temperature function is selected, the first number entered supersedes the internally stored BHCT and the second number entered overrides the predetermined BHST entry. If the time functions is selected, the first entry overrides the predetermined time associated with BHCT and the second entry overrides the predetermined time associated with BHST. The run key 34 may be actuated after either the first or second number is entered. This sequence is illustrated in FIG. 8 by the manual programming string commencing with the alternative selection of casing, liner or squeeze.

In the ramp substate of the manual state the operator may program either one or two ramps along which the final temperature will be achieved. Either of the two ramps may be specified by a combination of two out of the three parameters of target temperature, ramp rate and time. Programming for one ramp is accomplished by entering two of the three items and actuating the run key. Two ramps are programmed by entering an additional two parameters. In this substate both time values are measured from a zero or initial time. If a rate entry is used as either one of the two parameters in specifying a second ramp, then that ramp is computed using the initial parameters of the first ramp as the starting point.

If the display mode is selected instead of the heat mode, access can be gained to the various predetermined API heating schedule tables without disturbing any presently running program. This mode can be entered only from the reset mode by actuating the display mode select switch means 46 for the embodiment shown in FIG. 6. Once the display switch 46 has been actuated, one of the casing, liner or squeeze select switch means 50-54 is actuated and a well depth is entered. An optional temperature gradient can also be entered; however, if no temperature gradient is entered, a default value of 1.5° F./100 feet is used. After these entries, the operator depresses the verify switch means 48 once to observe BHCT and the time associated therewith and depresses the verify switch means 48 a second time to observe BHST and the time associated therewith. This mode automatically returns to the reset mode a predetermined time after the verify key 48 has been actuated and no further actuation has occurred.

In the verify mode, which can be entered only from the reset mode, actuation of the verify key 48 once displays BHCT and the time associated therewith of the current running program. A second actuation of the verify key 48 displays BHST and the time associated therewith, and a third actuation of the key displays the current temperature and time. Continued actuation of the verify key displays the aforementioned sets of data in a circular fashion. The reset mode is automatically entered a predetermined time after the last actuation of the verify key 48.

Whenever the chart recorder or printer 14 is to be used to provide a print out, the print switch means 62 is activated so that the actual temperature, the programmed temperature, the difference and the time will be printed at predetermined intervals. The visual indicator on the print switch 62 flashes while the printer is on. If the print switch is activated, but the printer is not connected, an error message appears on the display. The print switch is used for both starting and stopping the printer.

From the foregoing description and the flow chart shown in FIG. 8, it will be noted that the present invention provides means, responsive to the sequential actuation of the heat mode select switch means 36, the automatic state select switch means 38, one of the casing data select switch means 50, liner data select switch means 52, or squeeze data select switch means 54, the information entry switch means 44, the rate information select switch means 60, and the information entry switch means 44, for controlling the temperature device 4.

Also provided is means, responsive to the sequential actuation of the heat mode select switch means 36, the isothermal state select switch means 40, the temperature information select switch means 36, and the information entry switch means 44, for controlling the temperature device 4.

Still further provided is means, responsive to the sequential actuation of the heat mode select switch means 36, the manual state select switch means 42, one of the casing data select switch means 50, liner data select switch means 52, or the squeeze data select switch means 54, the information entry switch means 44, and either the temperature information select switch means and the information entry switch means 44 or the time information select switch means and the information entry switch means 44, for controlling the temperature device 4.

Further provided is means, responsive to the sequential actuation of the heat mode select switch means 36, the manual state select switch means 42, the temperature information select switch means, the information entry switch means 44, the time information switch means, and the information entry switch means 44, for controlling the temperature device 4.

The apparatus 2 also includes means, responsive to the sequential actuation of the heat mode switch means 36, the manual state select switch means 42, the rate information select switch means, the information entry switch means 44, the temperature information select switch means 56, and the information entry switch means 44, for controlling the temperature device 4.

The apparatus 2 also includes means, responsive to the sequential actuation of the heat mode switch means 36, the manual state select switch means 42, the time information select switch means, the information entry switch means 44, the rate information select switch means, and the information entry switch means 44, for controlling the temperature device 4.

The apparatus 2 still further includes means, responsive to the sequential actuation of the display mode select switch means 46, one of the casing data select switch means 50, liner data select switch means 52, or squeeze data select switch means 54, the information entry switch means 44, the rate information select switch means, and the information entry switch means 44, for displaying selected information.

Additionally, the apparatus 2 includes means, responsive to the actuation of the verify mode select switch means 48, for verifying the current operating programmed temperatures and times of the temperature device 4. Through this means verification of the current intended operating temperature and of the elapsed time since the start of a test using the temperature device 4 is achieved.

A method for controlling with computer means the heating of a substance by means of the heating device 4 comprises the steps of placing a computer means in a reset mode and changing the computer means from the reset mode to a heating mode. The method also comprises selecting one of three states within the heating mode wherein the three states include automatically adjusting the temperature to a value selected from a predetermined table of data stored within the computer means, isothermally adjusting the temperature to a value externally entered into the computer means, and manually adjusting the temperature as to value or as to time within which the temperature is reached or as to rate at which the temperature is reached by externally entering into the computer means a temperature value or a time period value or a rate value.

It is to be noted that the temperature control apparatus 2 of the present invention is contemplated to be specifically utilized with an ultrasonic cement analyzer system or a consistometer of the types used by Halliburton Services, other oil service industries and anyone interested in testing cement under API specifications. In such an application the apparatus 2 controls the temperature in a high pressure chamber having a sample of the cement slurry to be tested located therein.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for controlling a temperature device, comprising:

heat mode select switch means for placing said apparatus in a heat mode of operation from which one of three selectable states can be entered;

automatic state select switch means for placing said apparatus in an automatic operation state when said apparatus is placed in said heat mode;

isothermal state select switch means for placing said apparatus in an isothermal operation state when said apparatus is placed in said heat mode;

manual state select switch means for placing said apparatus in a manual operation state when said apparatus is placed in said heat mode;

information entry switch means for providing manually selectable numerical data to said apparatus;

temperature information select switch means for directing said apparatus to receive manually selectable temperature information from said information entry switch means;

time information select switch means for directing said apparatus to receive manually selectable time information from said information entry switch means;

rate information select switch means for directing said apparatus to receive manually selectable rate information from said information entry switch means;

casing data select switch means for instructing said apparatus to utilize predetermined casing temperature and casing time parameters stored in a memory of said apparatus;

liner data select switch means for instructing said apparatus to utilize predetermined liner temperature and liner time parameters stored said memory;

squeeze data select switch means for directing said apparatus to utilize predetermined squeeze temperature ans squeeze time parameters stored said memory;

means, responsive to the sequential actuation of said heat mode select switch means, said automatic state select switch means, one of said casing data select switch means, liner data select switch means, or squeeze data select switch means, said information entry switch means, said rate information select switch means, and said information entry switch means, for controlling the temperature device using the predetermined temperature and time parameters selected by the actuation of one of said casing data select switch means, said liner data select switch means or said squeeze data select switch means;

means, responsive to the sequential actuation of said heat mode select switch means, said isothermal state select switch means, said temperature information select switch means, and said information entry switch means, for controlling the temperature device to reach a selectable temperature as selected by the actuation of said temperature information select switch means and said information entry switch means;

means, responsive to the sequential actuation of said heat mode select switch means, said manual state select switch means, one of said casing data select switch means, liner data select switch means, or squeeze data select switch means, said information entry switch means, and either said temperature information select switch means and said information entry switch means or said time information select switch means and said information entry switch means, for controlling the temperature device in an automatic with partial override substate wherein the predetermined temperature and time parameters selected by the actuation of one of said casing data select switch means, said liner data select switch means, or said squeeze data select switch means are overridden by the temperature or time data manually selected by the actuation of one of said temperature information select switch means and said information entry switch means or said time information select switch means and said information entry switch means;

means, responsive to the sequential actuation of said heat mode select switch means, said manual state select switch means, said temperature information select switch means, said information entry switch means, said time information select switch means and said information entry switch means, for controlling the temperature device to achieve a temperature selected by the actuation of said temperature information select switch means and said information entry switch means in a time selected by the actuation of said time information select switch means and said information entry switch means; and means, responsive to the sequential actuation of said heat mode select switch means, said manual state select switch means, said rate information select switch means, said information entry switch means, said temperature information select switch means, and said information entry switch means, for controlling the temperature device to achieve a temperature selected by the actuation of said temperature information select switch means and said information entry switch means at a rate selected by the actuation of said rate information select switch means and said information entry switch means.

2. An apparatus as defined in claim 1, further comprising:

display mode select switch means; and means, responsive to the sequential actuation of said display mode select switch means, one of said casing data select switch means, liner data select switch means, or squeeze data select switch means, and said information entry switch means, for displaying information determined by the selected one of said casing data select switch means, liner data select switch means, or squeeze data select switch means, and said information entry switch means.

3. An apparatus as defined in claim 2, wherein said temperature and time information includes bottom hole circulating temperature values and time values associated with said bottom hole circulating temperature values and bottom hole static temperature values and time values associated with said bottom hole static temperature values.

4. An apparatus as defined in claim 2, further comprising:

verify mode select switch means; and means, responsive to the actuation of said verify mode select switch means, for verifying the current intended operating temperature of and the elapsed time since the initiation of the control of said temperature device by one of said means responsive to one of said sequential actuations.

5. An apparatus for controlling a temperature at which a cement slurry is to be tested, said apparatus comprising: information storage means for storing a compilation of data including predetermined parameters of casing temperature values and time values associated with said casing temperature values, liner temperature values and time values associated with said liner temperature values, and squeeze temperature values and time values associated with said squeeze temperature values;

switch means for manually entering into said information storage means variable temperature and time information; and computer means, responsive to said predetermined parameters and said variable temperature and time information, for determining bottom hole circulating temperature values and time values associated with said bottom hole circulating temperature values and for determining bottom hole static temperature values and time values associated with said bottom hole static temperature values for controlling said temperature at which a cement slurry is to be tested.

6. An apparatus as defined in claim 5, further comprising:

automatic operation select switch means for causing said computer means to determine said bottom hole circulating temperature values and time values associated with said bottom hole circulating temperature values and said bottom hole static temperature values and time values associated with said bottom hole static temperature values from said predetermined parameters;

isothermal operation select switch means for causing said computer means to determine said bottom hole circulating temperature values and time values associated with said bottom hole circulating temperature values and said bottom hole static temperature values and time values associated with said bottom hole static temperature values only from said variable temperature and time information; and manual operation select switch means for causing said computer means to determine said bottom hole circulating temperature values and time values associated with said bottom hole circulating temperature values and said bottom hole static temperature values and time values associated with said bottom hole static temperature values from a selectable combination of said predetermined parameters and said variable temperature and time information.

7. An apparatus as defined in claim 6, further comprising:

casing data switch means for directing said computer means to utilize said casing temperature values and time values associated with said casing temperature values when said automatic operation select switch means and said casing data switch means are actuated;

liner data switch means for directing said computer means to utilize said liner temperature values and time values associated with said liner temperature values when said automatic operation select switch means and said liner data switch means are actuated; and squeeze data switch means for directing said computer means to utilize said squeeze temperature values and time values associated with said squeeze temperature values when said automatic operation select switch means and said squeeze data switch means are actuated.

8. An apparatus as defined in claim 7, further comprising heating means, responsive to said computer means, for non-destructively applying heat to said cement slurry prior to the hardening of said cement slurry.

9. A method of non-destructively testing a material at a test temperature, said method comprising the steps of:
placing said material in a test environment to be maintained at said test temperature;
providing a predetermined compilation of data including casing temperature and casing time parameters, liner temperature and liner time parameters, and squeeze temperature and squeeze time parameters;
selectably entering variable modification parameters with said predetermined compilation of data;
providing first switch means for controlling said test temperature in an automatic operation state;
providing second switch means for controlling said test temperature in an isothermal operation state;
providing third switch means for controlling said test temperature in a manual operation state;
actuating one of said first switch means, said second switch means, or said third switch means;
determining a first temperature value and a first time value from said predetermined compilation of data when said first switch means is actuated;
determining a second tempeature value and a second time value from, and only from, said variable modification parameters when said second switch means is actuated;
determining a third temperature value and a third time value from a combination of said predetermined compilation of data and said variable modification parameters when said third switch means is actuated;
controlling said test temperature of said environment in response to said first temperature value and said first time value when said first switch means is actuated;
controlling said test temperature of said environment in response to said second temperature value and said second time value when said second switch means is actuated;
controlling said test temperature of said environment in response to said third temperature value and said third time value when said third switch means is actuated; and
observing the non-destructive response of said material in said test environment to said steps of controlling said test temperature.

10. A method for non-destructively testing a cement slurry, comprising the steps of:
associating said cement slurry with a heating device; and
controlling said heating device to a selectable temperature for a selectable time period, said step of controlling said heating device including:
maintaining in a memory means of a computer means a predetermined compilation of data including tables of American Petroleum Institute temperature and time parameters used for testing cement slurries used in downhole environments;
providing means for entering modification parameters into said computer means;
computing, from said predetermined compilation of data and said modification parameters, bottom hole circulating temperature values and time values associated with said bottom hole circulating temperature values and bottom hole static temperature values and time values associated with said bottom hole static temperature values; and
operating said heating device in response to said bottom hole circulating temperature values and time values associated with said bottom hole circulating temperature values and said bottom hole static temperature values and time values associated with said bottom hole static temperature values.

11. A method as defined in claim 10, wherein said step of controlling said heating device further includes the steps of:
controlling said computer means to function in either an automatic operation state or a manual operation state;
computing with said computer means said bottom hole circulating temperature values and time values associated with said bottom hole circulating temperature values and said bottom hole static temperature values and time values associated with said bottom hole static temperature values from said predetermined compilation of data when said automatic operation state is selected; and
computing with said computer means said bottom hole circulating temperature values and time values associated with said bottom hole circulating temperature values and said bottom hole static temperature values and time values associated with said bottom hole static temperature values from a combination of said predetermined compilation of data and said modification parameters when said manual operation state is selected.

* * * * *